United States Patent [19]

Grodevant

[11] Patent Number: 5,258,699
[45] Date of Patent: Nov. 2, 1993

[54] MOTOR CONTROL SYSTEM ESPECIALLY FOR CONTROL OF AN OPTICAL SCANNER

[75] Inventor: Scott R. Grodevant, Hilton, N.Y.

[73] Assignee: PSC, Inc., Webster, N.Y.

[21] Appl. No.: 784,331

[22] Filed: Oct. 29, 1991

[51] Int. Cl.$^5$ ............................................. H02K 29/08
[52] U.S. Cl. .................... 318/685; 318/254; 235/462; 235/470
[58] Field of Search ............... 318/560–646; 250/235, 236; 358/494, 285, 296; 346/108, 107 R, 76 C, 160, 154; 235/462, 467, 472, 469; 359/211, 202, 834

[56] References Cited

U.S. PATENT DOCUMENTS

| | | | |
|---|---|---|---|
| 4,081,671 | 3/1978 | Bohme et al. | 318/577 X |
| 4,140,903 | 2/1979 | Clark | 250/236 |
| 4,232,345 | 11/1980 | Zollman et al. | 358/299 |
| 4,310,790 | 1/1982 | Mulet-Marquis | 318/608 |
| 4,349,822 | 9/1982 | Decalonne | 318/629 X |
| 4,371,782 | 2/1983 | Brouwer | 318/577 X |
| 4,409,469 | 10/1983 | Yasuda et al. | 235/463 |
| 4,453,084 | 6/1984 | Brouwer | 318/577 X |
| 4,486,654 | 12/1984 | Brouwer | 250/202 |
| 4,496,831 | 1/1985 | Schwartz et al. | |
| 4,579,122 | 4/1986 | Shimizu et al. | 73/620 X |
| 4,709,195 | 11/1987 | Hellekson et al. | 318/254 |
| 4,820,911 | 4/1989 | Arackellian et al. | |
| 4,837,493 | 6/1989 | Maeno et al. | 318/685 |
| 4,843,291 | 6/9189 | Predina | 318/605 |
| 4,847,555 | 7/1989 | Stammer et al. | 318/254 |
| 4,967,188 | 10/1990 | Collins Jr. | 388/806 |
| 4,970,450 | 11/1990 | Karl et al. | 318/654 |
| 5,001,406 | 3/1991 | Peterson | 318/254 |
| 5,013,899 | 5/1991 | Collins, Jr. | 318/254 |
| 5,023,818 | 6/1991 | Wittensoldner et al. | 318/272 |
| 5,166,944 | 11/1992 | Conemac | 372/24 |

Primary Examiner—Paul Ip
Attorney, Agent, or Firm—M. LuKacher

[57] ABSTRACT

A reflective deflector of a light beam which scans in opposite directions across a bar code is controlled in scan angle by monitoring the AC component of a current passing through a winding of a scanning motor which oscillates the deflector to scan the beam across the code over a scan angle. The inductance of the winding corresponds to the length of the scan angle and is measured in terms of the peak to peak value of the AC component during a scan period or frame which occurs over an interval corresponding to the reciprocal of the scan rate. During successive periods, successive trains of pulses are generated. The number of pulses or their duty cycle during each period is changed in accordance with an error signal corresponding to the difference between the desired scan angle and the peak to peak value of the AC component. The pulse trains are translated into trains of current pulses which are passed through another winding of the motor in opposite directions so as to drive the rotor of the motor which reciprocates the reflector in opposite directions over the desired scan angle. By modifying the desired scan angle in accordance with changes in temperature affecting the system, the system can be compensated for temperature changes. By modifying the error signal by processing it with a filter, the response of the system to changes in scan angle can be controlled.

16 Claims, 5 Drawing Sheets

MOTOR CONTROL SYSTEM ESPECIALLY FOR CONTROL OF AN OPTICAL SCANNER

The present invention relates to scanning control systems, and particularly to a control system for controlling the angular displacement of a rotor of a motor so that a deflector which is reciprocally oscillated with the rotor scans a light beam over a desired scan angle.

The present invention is especially suitable for use in bar code scanners for controlling the deflection of a beam which scans a bar code so that it scans over a desired angle in opposite directions thereby providing reflected light which can be detected and used to read the bar code. Aspects of the invention may find other applications wherever motors are used in which the angle over which the rotor or shaft of the motor turns must be stabilized or controlled.

Scanning motors have been used in bar code scanners for operating a deflector which scans a beam across the bar code. Control systems for such scanning motors which operate with analog signals are described in U.S. Pat. No. 4,496,831, issued Jan. 29, 1985 to J. Schwartz, et al. A digital control system for a scanning motor is the subject matter of U.S. Pat. application Ser. No. 07/652,158 filed Feb. 7, 1991 by J. M. Eastman, Anna M. Quinn, Scott R. Grodevant and John A. Boles and assigned to the same assignee as the present application. Scan angle control of the motor which operates a beam deflector in the bar code scanning and reading system described in the Eastman et al. application utilizes successive trains of pulses, the duty cycle of which controls the scan angle. It is desirable to provide control of the scan angle so that a desired scan angle is maintained during successive scans alternately and opposite directions.

It has been discovered that an effective means for scan angle control, which may be implemented by digital techniques using the microprocessor controller already present in a bar code scanner, may be effected by monitoring the scan angle during each scan directly from the inductance presented by a winding of the scanning motor. The inductance varies, it is believed, because the magnetic coupling between the stator and rotor of the motor changes as a function of the angular displacement. The winding used to measure the inductance may be one winding of a two winding or two phase stepper motor, the rotor of which is connected via the motor shaft to the reflector which deflects the light beam over the scan angle as the rotor turns. The variation in inductance may be directly monitored by monitoring the A.C. modulation of a D.C. bias current passing through the winding. The peak amplitudes of opposite relative polarity of the A.C. current have been found to represent the scan angle executed during a scan. The scans occur at a scan period which is equal to the reciprocal of the scan rate, which in a practical bar code scanner may suitably be around 30 scans per second. By sampling the waveform of the current several times during each period, a digital signal corresponding to the peak to peak value of the A.C. component may be computed. This signal corresponds to the scan angle and may be used to derive a digital error signal corresponding to deviations of the scan angle from a desired or set point scan angle. The error signal may be filtered in order to control the response of a feedback system which provides successive bipolar current pulses trains. These current pulse trains are passed through another winding of the motor so as to drive the motor. The rotor then oscillates through scan angles which are stabilized at the desired scan angle. The generation of the pulse trains and the control of the number of pulses or duty cycle during successive scan periods is preferably implemented under program control in the microprocessor. The desired angle or set point may be controlled to compensate for temperature changes which affect the operation of the system and also to vary the scan angle between wide and narrow angles to facilitate locating and reading bar codes.

Accordingly, it is the principal object of the present invention to provide an improved optical scanning system by means of which the angle over which an optical beam is scanned (the scan angle) may be controlled and stabilized.

It is a further object of the present invention to provide an improved motor, control system for controlling the angular displacement of the rotor and output shaft of a motor so as to control, and if desired stabilize, the displacement so as to remain at a constant or desired displacement.

It is a further object of the present invention to provide an improved control system for controlling the angular displacement of a rotor or output shaft of a motor to a desired displacement while compensating for temperature changes.

It is a still further object of the present invention to provide an improved control system for controlling the angular displacement of a rotor of a motor to control the displacement in accordance with a predetermined control function.

Briefly described, a control system for controlling the angular displacement of a rotor of a motor during successive periods of time which embodies the invention utilizes a motor having a first winding which is magnetically coupled to the rotor and the inductance of which varies in accordance with the angular displacement of the rotor. Circuitry (which may be implemented in part in a microprocessor) is connected to the first winding and generates, in response to the inductance, a control signal corresponding to the error of the angular displacement of the rotor during each period from a desired displacement. Motor driver circuits respond to the control signal and drive the motor to execute with the desired displacement.

The foregoing and other objects features and advantages of the invention, as well as a presently preferred embodiment thereof, will become more apparent from the reading of the following description in connection with the accompanying of drawings in which.

Figure 1:
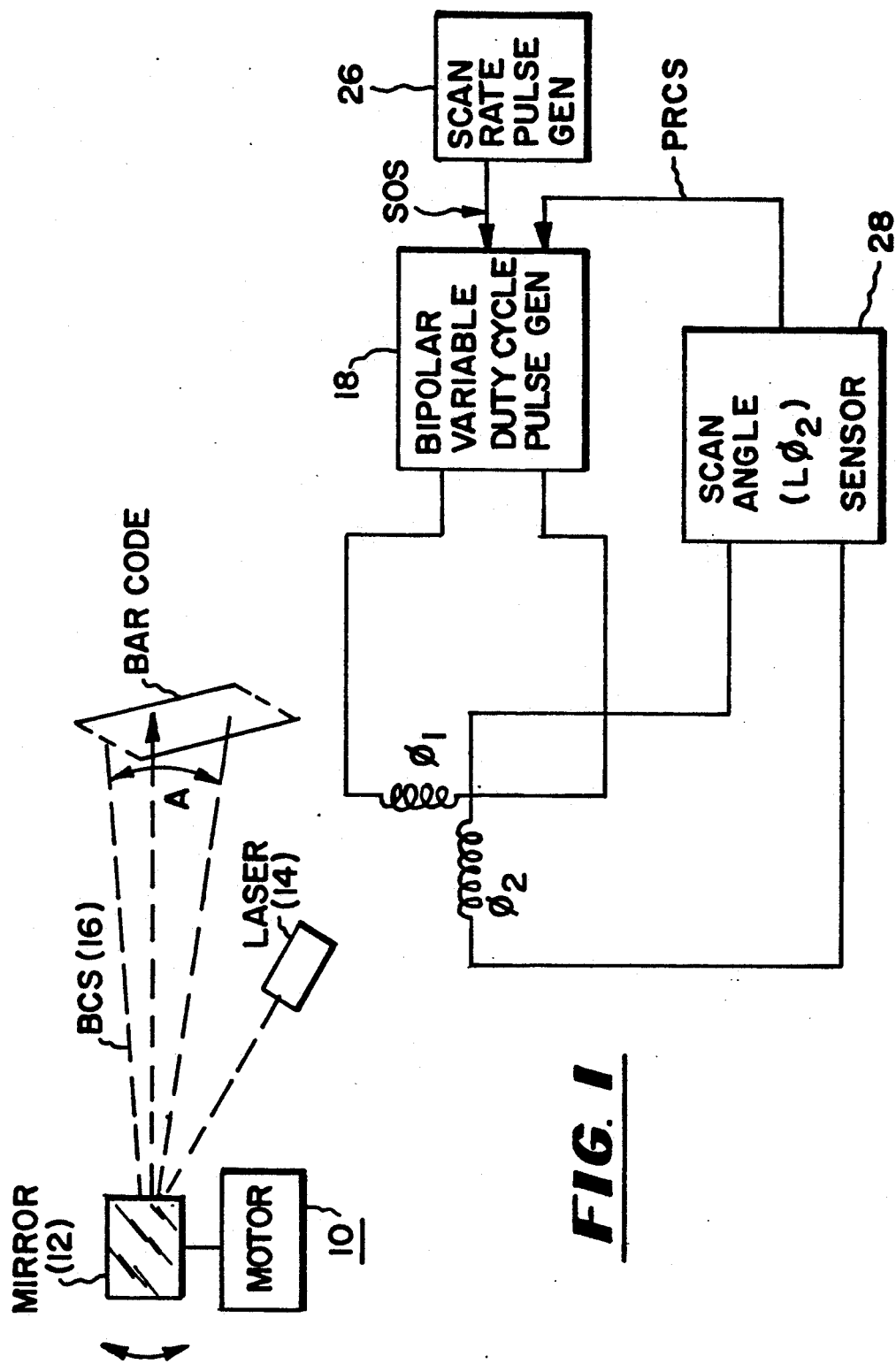
FIG. 1 is a schematic diagram of a bar code scanner embodying the invention.
Figure 2:
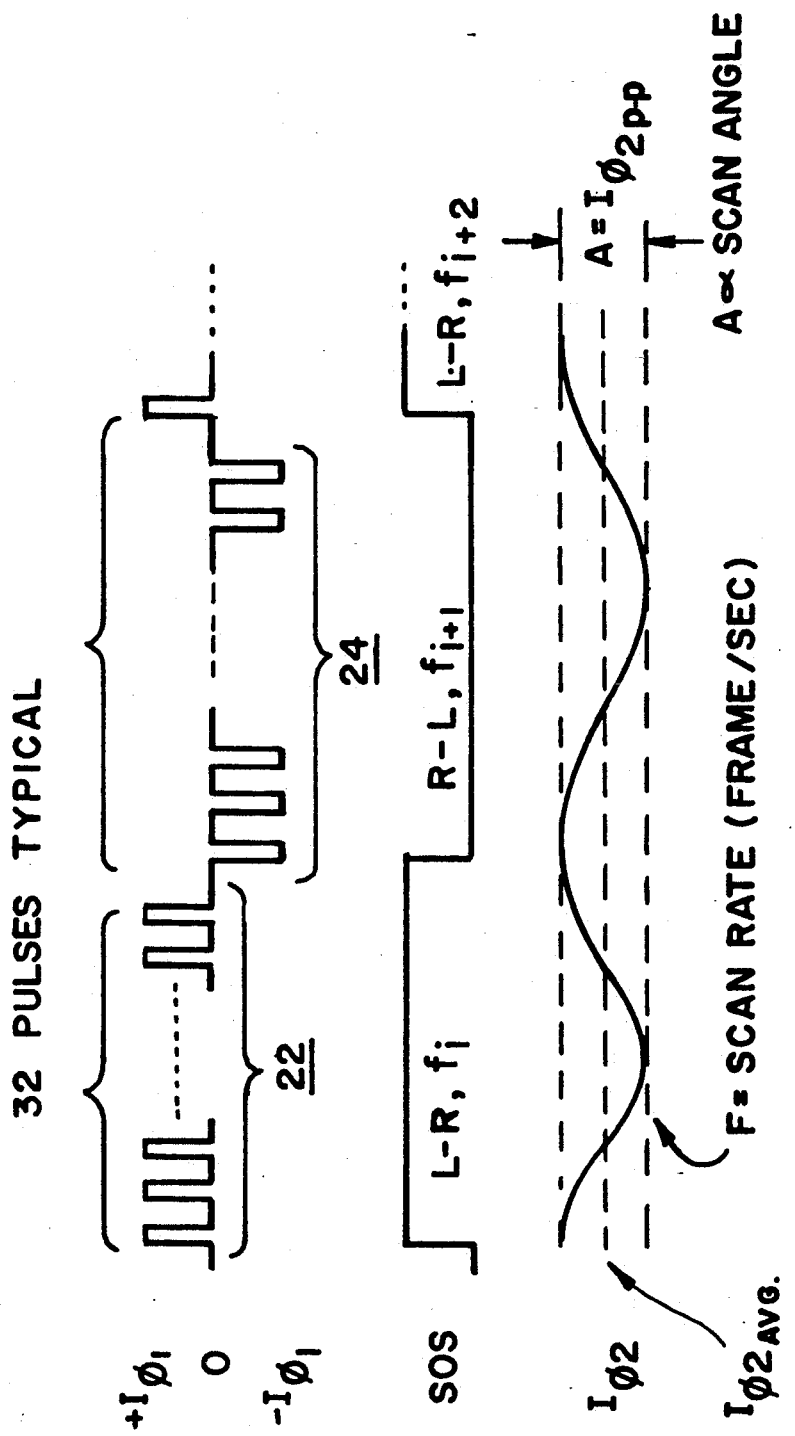
FIG. 2 is a series of waveforms generated in the operation of the system shown in FIG. 1.

Referring to FIGS. 1 and 2, a stepper motor 10, is used, which may be a commercial two phase stepper motor, for example, having ten stator poles and twelve rotor poles. The rotor is coupled by way of a motor shaft to a reflector mirror (a deflector) in the form of a mirror 12. Light from a source such as a laser (for example a laser diode and associated optics) 14 is projected as a beam incident on the mirror 12. The rotor oscillates reciprocally and scans the beam across a bar code executing a scan angle A. The other elements of a bar code scanner (BCS) 16 besides the motor 10, the mirror 12, and the laser 14 are not illustrated to simplify the drawing. Such bar code scanners are known in the art. See, e.g., U.S. Pat. No. 4,820,911. Improved operation is obtained by stabilizing the scan angle through the use of the control system shown in FIG. 1 and elsewhere in this application.

The motor 10 has two stator windings indicated as the $\Phi 1$ and $\Phi 2$ windings. The rotor is driven by bipolar pulses of variable pulse rate generated by a pulse generator 18. These pulses are generated in successive trains, each containing a multiplicity of pulses, for example, from 32 pulses as illustrated at 22 and 24 in FIG. 2. These pulses are current pulses which pass in opposite directions as indicated by their polarity as $+I\Phi 1$ and $-I\Phi 1$ in FIG. 2. The trains continue for a number of scans until the bar code is read. The scan rate is established by a scan rate pulse generator 26 which provides the start of scan SOS signal during successive frames. These frames are illustrated in FIG. 2 as $f_i, f_{i+1}, f_{i+2}...$. This scan is in opposite directions, for example from left to right (L-R) during the scan period $f_i$, then from right to left (R-L) during this next scan period, $f_{i+1}$ and again from left to right (L-R) in $f_{i+2}$ period during the next successive scan.

The trains may contain a variable number of pulses each of fixed duration. As the number of pulses per frame (period) is increased, because their width is fixed, the average power into the motor increases, and correspondingly, the resulting scan angle increases.

A presently preferred embodiment involves driving the $\Phi_1$ winding with a fixed number of pulses, 32, for example. The width or duty cycle of the pulses are varied to control scan angle. The following equation relates the number of pulses, N, to the desired scan rate, SR, and the individual pulse period, t:

$$t = \frac{1}{N \cdot SR}$$

The duty cycle is varied by a pulse rate control signal (PRCS) which is produced by a scan angle sensor 28 which senses, in effect, the inductance of the $\Phi 2$ coil (L$\Phi 2$). The inductance is sensed in accordance with the A.C. modulation of the current I$\Phi 2$ which passes through the $\Phi 2$ coil. This modulation is illustrated about an average or bias current value in FIG. 2. The maximum or peak to peak value of the current has been found to be approximately proportional to the scan angle A. By measuring the peak to peak value during each period, $f_i, f_{i+1}, f_{i+2}...$, the PRCS is developed which changes the duty cycle of the pulse stream during consecutive scans. Alternatively, the number of pulses may be varied. The result of both alternatives is to vary the average amplitude of the current which passes, during the successive scan periods, through the $\Phi 1$ stator winding. It is presently preferred to change the duty cycle in response to the PRCS. Then the duration of each pulse in the train is changed by changing the on-time during each of the pulse periods.

Figure 3:
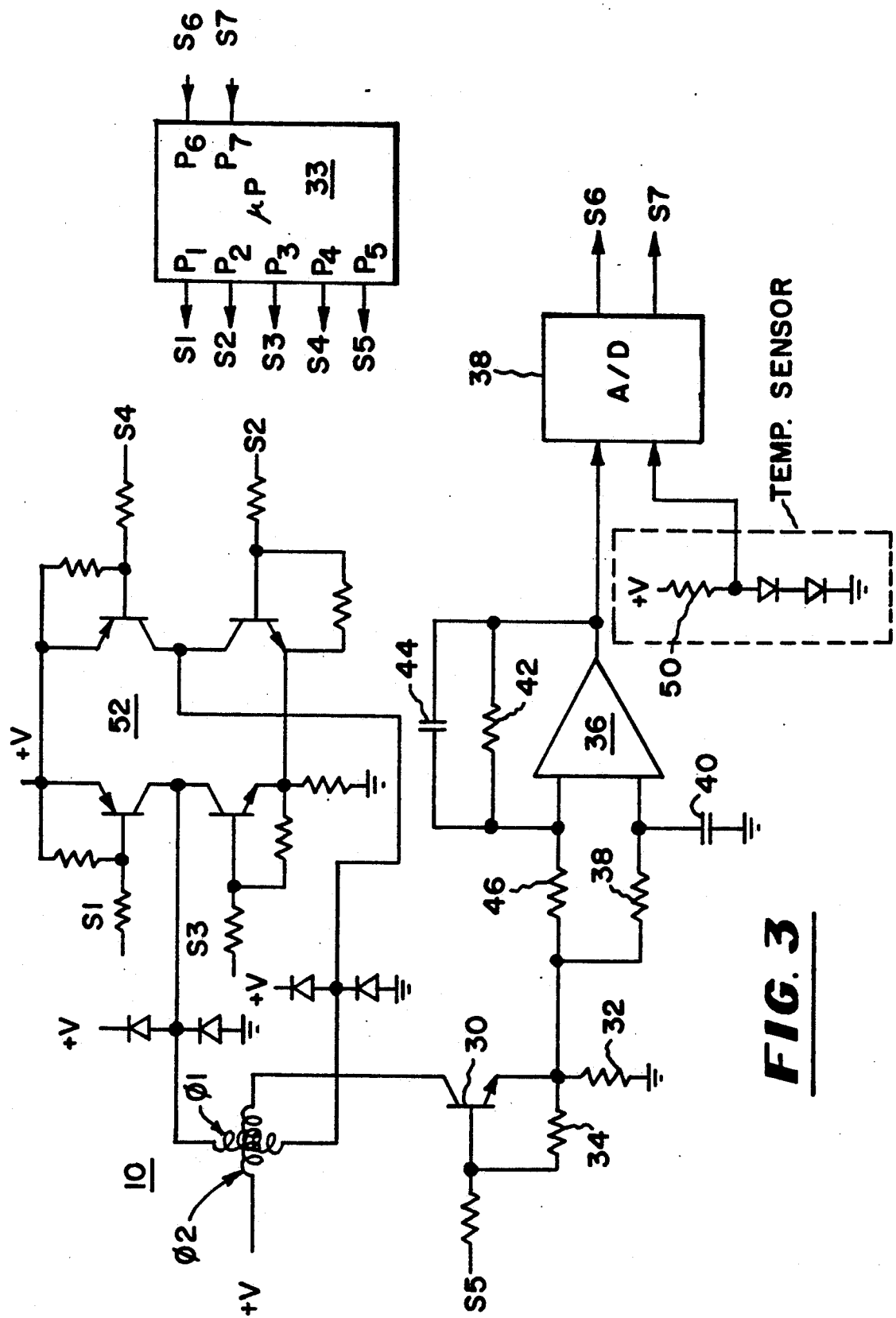
FIG. 3 is a block diagram of a control system of the type shown in FIG. 1 in which digital control circuits, including a microprocessor controller are used.

The control system may be implemented by analog or digital circuits. Presently, a digital implementation is preferred. This implementation is shown in FIG. 3. The stator winding of the motor 10 alone is shown. The inductance of the $\Phi 2$ coil is sensed by passing a current, a bias current, through the $\Phi 2$ winding, via a transistor 30 which is turned on when scanning is initiated by an output signal S5 from an output port P5 of a microprocessor 32. The microprocessor may be a conventional microprocessor. It is connected to an electrically programable read only memory EPROM (not shown) in which the operating program of the system is stored. This program will become apparent from FIG. 5.

The transistor 30 passes the current 112 through a measuring resistor 32 so as to develop a voltage containing the A.C. modulation. Another resistor 34 between the emitter and base of the transistor 30 provides rapid turn off, when the S5 signal turns off drops from $+V$, which turns the transistor on hard to saturation, to approximately zero or ground voltage.

An inverting operational amplifier stage 36 shifts the voltage so that the modulation varies about the middle of the sensing range of an analog to digital convertor (A/D) 38. This stage 36 may have a gain of approximately 20 and is biased to follow the average value of the voltage across the resistor 32. A circuit consisting of a resistor 38 and a capacitor 40 is connected to the non-inverting input of the amplifier. The resistor 38 and capacitor 40 have a time constant much greater than the scan period (the reciprocal of the scan rate). Thus, the stage 36 is biased to follow the average value. Another resistor 42 and the capacitor 44 are connected in feedback relationship between the output and the inverting terminal so as to remove high frequency components, and with the resistor 46 and the resistor 32 establishes the gain of the stage 36.

The analog digital converter 38 has an output S6 which consists of successive samples of the output of the inverting amplifier. The converter 38 also provides an output S7 in response to an analog signal from a temperature sensor 48 provided by a pair of forward biased diodes, the output voltage from which is tapped across a resistor 50 and varies with temperature. S6 and S7 are digital signals, for example, eight bit signals. These signals are applied to ports P6 and P7 of the microprocessor controller 33.

Figure 4:
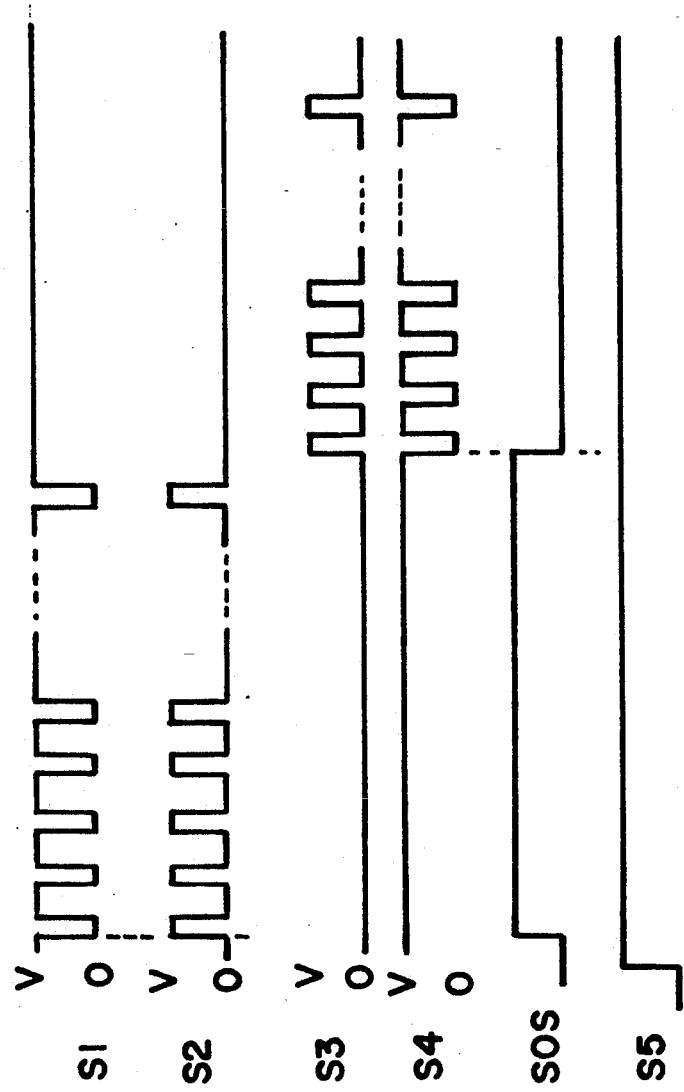
FIG. 4 is a series of waveforms generated in the operation of the system shown in FIG. 3.

The microprocessor controller 33 has four outputs S1, S2, S3 and S4 which control a H-bridge driver circuit 52. This circuit is a push-pull driver similar to that used in the motor drive circuits of the above-referenced of the Eastman et al. application. During successive periods, as shown in FIG. 4, pulses of opposite polarity are applied to transistors in opposite corners of the bridge, thereby producing a train of current pulses in one direction through the $\Phi 1$ stator winding of the motor 10. On the next successive period, e.g., $f_{i+1}$, S1 and S2 are respective high and low so that no current flows through the transistors connected to the P1 and P2 ports. On the next successive period, $f_{i+1}$, the S3 and S4 outputs are pulsed to produce pulses of opposite polarity which produce current pulses in the opposite direction through the $\Phi 1$ stator winding. The number or duty cycle of these pulses is determined by the timing of the S1 to S4 outputs which determines the on and off period of each pulse in each train. The driver circuit includes four diodes connected between $+V$ and ground which snub the back-EMF voltage transients produced when stopping current flow through the motor winding. The S1, S2, S3 and S4 pulses therefore produce, in successive scan periods, bipolar current pulses in the $\Phi 1$ winding such as shown at 22 and 24 in FIG. 2. At the beginning of each pulse train or after occurrence of a predetermined number of pulses in each train, a SOS signal consisting of on and off periods $f_i$, $f_{i+1}$, $f_{i+2}$ . . are generated. This signal is available at P6 and provides the S6 signal which is used in the bar code scanner to indicate start of scan in each direction.

Figure 5:
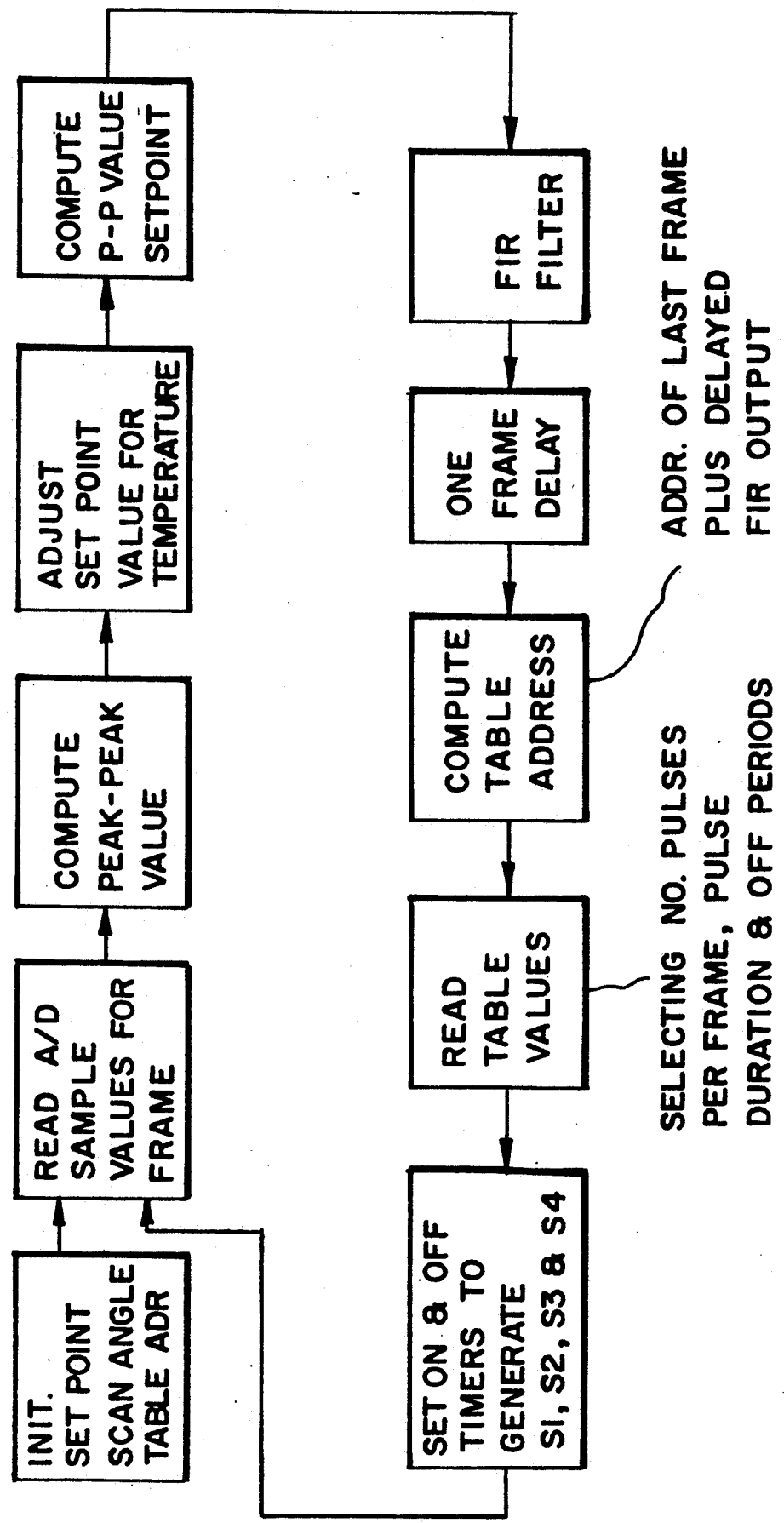
FIG. 5 is a functional diagram (flow chart) illustrating the programming of the microprocessor shown in FIG. 3.

Referring to FIG. 5, the program operates by first initializing a set point value corresponding to the desired scan angle and an initial address for tables which contain bytes corresponding to the various number of pulses and the off periods for different scan angles, for example there may be corresponding values in each table for pulse train values from 8 to 73 and for corresponding off periods corresponding to the number of pulses to obtain different scan angles in successive frames. On initialization a desired scan angle, for example 30°, is obtained by addressing these tables. The table values when read set on and off timers which generate S1, S2, S3 and S4. The tables can be reconfigured to change the scan period.

After initialization the sample values from the analogue to digital converter are read and the peak positive and peak negative values are stored. The peak to peak value is computed by subtracting the peak negative from peak positive values. The set point value is then adjusted to compensate the system for temperature changes. This is accomplished by using the S7 input from the A to D which reads the temperature sensor 48. If desired, the set point value, which corresponds to the desired scan angle, may be changed. At the beginning of code reading, the angle may be made small so that the beam appears brighter and may be more readily aimed on the code to be scanned. Alternatively, it may be desired to start scanning with a large scan angle to locate the code and then narrow the scan angle.

An error signal is obtained by computing the difference between the peak to peak value and the set point. This provides an output signal during each period. The successive output signals are then filtered in a finite impulse response (FIR) filter which is implemented by a sequence of instructions known in the art and, therefore, not shown in detail in FIG. 5. The filter controls the response of the system and produces output signals of adjusted value. A new output signal of digital values are provided at the desire scan angle. This tailors the response of the system and determines how fast the scan angle can increase and decrease. For example, it may be desired to overshoot the desired scan angle and then reduce it until reaching the desired scan angle. The output of the FIR filter is delayed by one frame time in order to accommodate computing delays in the microprocessor.

The adjusted value of the motor drive signal from the FIR filter after the delay appears on each frame and is used to address the tables containing the number of pulses and the off periods between pulses for the ensuing frame. In order to obtain the address, the address on the last frame is added to the output of the FIR filter on the previous frame. Thus the pulse train values read from the table may increase the duty cycle generated by the timers or decrease the duty cycle so as to increase or reduce the scan angle until the desired scan angle is obtained by feedback control effected by the system. The scan angle is controlled on each frame in order to bring it to the set point value as adjusted by the temperature compensation in accordance with the response dictated by the FIR filter.

From the foregoing description will be apparent that there has been provided an improved system for stabilizing scan angle which is especially adapted for use in a bar code scanner. Variations and modifications in the herein described system, as well as other applications therefor, within the scope of the invention, will undoubtedly suggest themselves to those skilled in the art. Accordingly the foregoing description should be taken as illustrative and not in a limiting sense.

I claim:

1. A control system for controlling the angular displacement of a rotor of a motor during successive periods of time which comprises a first winding of said motor magnetically coupled to said rotor, the inductance of which first winding varies in accordance with the angular displacement of said rotor, means connected to said first winding for generating in response to said inductance a control signal corresponding to the error of the angular displacement of said rotor during each of said successive periods of time from a desired displacement, and motor drive means response to said control signal for driving said motor with said desired displacement, wherein said motor has a stator having said the first winding and a second winding thereon magnetically coupled to said rotor, and said motor drive means being connected to said second winding, and wherein said motor drive means includes means for driving current in opposite directions during alternate ones of said successive periods to reciprocally oscillate said rotor in opposite directions in alternate ones of said successive periods, said control signal generating means comprising means for detecting first signals corresponding to said inductance and means for generating a set point signal corresponding to the desired angular displacement of said rotor, and means for generating said control signal as a function of the difference between said set point signal and said first signal.

2. The system according to claim 1 wherein said motor is a scanning motor and further comprising light reflecting means coupled to said rotor for scanning a beam of light across a path having a length corresponding to said angular displacement.

3. The system according to claim 1 further comprising means for adjusting said set point signal in accordance with temperature, and means included in said control signal generating means for generating said control signal in response to the set point signal after temperature adjustment.

4. The system according to claim 1 wherein said means for detecting said first signal comprises means for passing a current through said first winding the amplitude of which alternates as said rotor oscillates between amplitudes of opposite relative polarity, and means responsive to the peak values of said amplitude of opposite relative polarity during each of said periods of providing said first signals.

5. The system according to claim 1 wherein said motor drive means further comprises means responsive to said control signal for passing in opposite directions during alternate ones of said successive periods a train containing a multiplicity of current pulses of duty cycle corresponding to said control signal.

6. The system according to claim 5 wherein said pulses are of equal number during each of said periods but of varying time durations, said durations corresponding to said control signal.

7. The system according to claim 1 further comprising filter means for processing said control signal to vary the response of said system to said control signal.

8. An optical scanning system for deflecting a beam of light over a scan angle of desire length which comprises a stepper motor having a rotor and a stator, said stator having at least first and second windings thereon, a reflector upon which said beam is incident and which reflects said beam, said reflector being reciprocally rotatable with said rotor in opposite directions to deflect said beam over said scan angle, means for generating successive trains of pulses and applying said trains to said second stator winding for driving said rotor and said reflector over said scan angle successively in opposite directions, means for passing a bias current through said first winding which is modulated with an alternating current component as said rotor oscillates over said scan angle, means responsive to the peak to peak of said alternating current component for controlling said means for generating said pulse trains for changing the average current value of said pulse trains to maintain said scan angle of said desired length.

9. The system according to claim 7 wherein said motor is a two phase motor and the first and second windings establish magnetic field 90° out of phase with each other through said rotor.

10. The system according to claim 9 wherein said rotor is permanently magnetized in position to be centrally disposed within the length of said scan angle when said bias current is applied to said first winding.

11. The system according to claim 8 wherein said generating means includes means for generating said pulses in each of said successive trains and the intervals there between within a period equal to the reciprocal of a given scan rate at which said rotor oscillates to scan said beam repetitively in opposite directions over said scan angle, and wherein said pulse train controlling means includes means for varying the duty cycle of each pulse is said trains.

12. The system according to claim 11 wherein said pulse train controlling means includes means for varying said duty cycle during said periods by providing an equal number of pulses in each of said trains which are of different duration but have like intervals therebetween.

13. The system according to claim 8 wherein said peak to peak value responsive means includes means for measuring said peak to peak values for each successive reciprocation of said rotor as it deflects said beam over said scan angle to provide upon each deflection over said scan angle successive output signals corresponding to the length of said scan angle, and means for modifying successive ones of said pulse trains to vary the average current values of said successive ones of said pulse trains in response to successive ones of said output signal whereby to control said scan angle.

14. The system according to claim 13 further comprises filter means for processing said output signal to change the response of said means for varying the average current to control said scan angle.

15. The system according to claim 13 further comprising means for generating error signals corresponding to the difference between said output signals and a set point signal corresponding to the desired length of said scan angle, and means for operating said means for modifying successive ones of said pulse trains in responses to said error signals.

16. The system according to claim 15 further comprising means for varying said error signals to compensate for temperature changes affecting said system.

* * * * *